United States Patent
Shuey

(10) Patent No.: US 7,355,867 B2
(45) Date of Patent: Apr. 8, 2008

(54) POWER SUPPLY FOR AN ELECTRIC METER HAVING A HIGH-VOLTAGE REGULATOR THAT LIMITS THE VOLTAGE APPLIED TO CERTAIN COMPONENTS BELOW THE NORMAL OPERATING INPUT VOLTAGE

(75) Inventor: Kenneth C. Shuey, Zebulon, NC (US)

(73) Assignee: Elster Electricity, LLC, Raleigh, NC (US)

(*) Notice: Subject to any disclaimer, the term of this patent is extended or adjusted under 35 U.S.C. 154(b) by 105 days.

(21) Appl. No.: 10/919,645

(22) Filed: Aug. 17, 2004

(65) Prior Publication Data

US 2006/0038548 A1   Feb. 23, 2006

(51) Int. Cl.
H02H 7/122   (2006.01)
H01G 2/12    (2006.01)
H02M 3/335   (2006.01)

(52) U.S. Cl. .................. 363/56.11; 363/50; 363/21.15; 361/15

(58) Field of Classification Search ........ 323/299–301, 323/303, 270, 266, 267, 272; 363/21.12, 363/21.15, 21.16, 21.18, 50–52, 56.08, 56.11, 363/89, 56.01, 56.05, 56.1; 361/18, 91.1, 361/15, 35; 307/34, 36; 320/166, 167
See application file for complete search history.

(56) References Cited

U.S. PATENT DOCUMENTS

| | | |
|---|---|---|
| 2,724,821 A | 11/1955 | Schweitzer, Jr. |
| 3,569,818 A | 3/1971 | Dahlinger et al. ........ 363/21.12 |
| 3,794,917 A | 2/1974 | Martin et al. |
| 3,806,875 A | 4/1974 | Georget |
| 3,826,985 A | 7/1974 | Wiley |
| 3,976,941 A | 8/1976 | Milkovic |

(Continued)

FOREIGN PATENT DOCUMENTS

AU   68113/87   8/1987

(Continued)

OTHER PUBLICATIONS

TOP242-249 datasheet, Power Integrations, Jul. 2001, p. 1.*

(Continued)

*Primary Examiner*—Jeffrey Sterrett
*Assistant Examiner*—Harry Behm
(74) *Attorney, Agent, or Firm*—Woodcock Washburn LLP

(57) ABSTRACT

Disclosed is an invention relating to a power supply for use in an apparatus for measuring electrical energy, comprising, in one embodiment, a first switching device, a device for storing electrical charge in electrical connection with the first switching device, a second switching device in electrical connection with the device for storing electrical charge, a first device for controlling the flow of current in electrical connection with the second switching device, and a third switching device in electrical connection with the first device for controlling the flow of current, wherein the first device for controlling the flow of current enables an input voltage to be applied to the second switching device when the input voltage is below a predetermined amount, and enables the input voltage to be applied to the second and third switching devices when the input voltage is above the predetermined amount.

15 Claims, 5 Drawing Sheets

U.S. PATENT DOCUMENTS

| | | | |
|---|---|---|---|
| 4,007,061 A | 2/1977 | Le Coturier | |
| 4,034,292 A | 7/1977 | McClelland, III | |
| 4,077,061 A | 2/1978 | Johnston et al. | |
| 4,092,592 A | 5/1978 | Milkovic | |
| 4,096,436 A | 6/1978 | Cook et al. | |
| 4,119,948 A | 10/1978 | Ward et al. | |
| 4,120,031 A | 10/1978 | Kincheloe et al. | |
| 4,131,844 A | 12/1978 | Hucker et al. | |
| 4,156,273 A | 5/1979 | Sato | |
| 4,156,931 A | 5/1979 | Adelman et al. | |
| 4,156,932 A | 5/1979 | Robinson et al. | |
| 4,158,810 A | 6/1979 | Leskovar | |
| 4,186,339 A | 1/1980 | Finger | |
| 4,209,826 A | 6/1980 | Priegnitz | |
| 4,213,119 A | 7/1980 | Ward et al. | |
| 4,241,237 A | 12/1980 | Paraskevakos et al. | 379/106.06 |
| 4,283,772 A | 8/1981 | Johnston | |
| 4,291,375 A | 9/1981 | Wolf | |
| 4,298,839 A | 11/1981 | Johnston | |
| 4,301,508 A | 11/1981 | Anderson et al. | |
| 4,315,248 A | 2/1982 | Ward | |
| 4,335,445 A | 6/1982 | Nercessian | |
| 4,335,447 A | 6/1982 | Jerrim | 714/22 |
| 4,355,361 A | 10/1982 | Riggs et al. | |
| 4,359,684 A | 11/1982 | Ley | |
| 4,361,877 A | 11/1982 | Dyer et al. | |
| 4,378,524 A | 3/1983 | Steinmüller | |
| 4,389,702 A | 6/1983 | Clemente et al. | |
| 4,399,510 A | 8/1983 | Hicks | |
| 4,407,061 A | 10/1983 | Grodkiewicz et al. | |
| 4,415,853 A | 11/1983 | Fisher | |
| 4,420,721 A | 12/1983 | Dorey et al. | |
| 4,422,039 A | 12/1983 | Davis | |
| 4,437,059 A | 3/1984 | Hauptmann | |
| 4,438,485 A | 3/1984 | Voigt | |
| 4,439,764 A | 3/1984 | York et al. | |
| 4,455,453 A | 6/1984 | Paraskevakos et al. | 379/106.06 |
| 4,467,434 A | 8/1984 | Hurley et al. | |
| 4,489,384 A | 12/1984 | Hurley et al. | |
| 4,497,017 A | 1/1985 | Davis | |
| 4,509,128 A | 4/1985 | Coppola et al. | |
| 4,516,213 A | 5/1985 | Gidden | |
| 4,542,469 A | 9/1985 | Brandyberry et al. | |
| 4,566,060 A | 1/1986 | Hoeksma | |
| 4,581,705 A | 4/1986 | Gilker et al. | |
| 4,600,881 A | 7/1986 | LaRocca et al. | |
| 4,607,320 A | 8/1986 | Matui et al. | |
| 4,620,150 A | 10/1986 | Germer et al. | 324/103.12 |
| 4,621,330 A | 11/1986 | Weikel | |
| 4,622,627 A | 11/1986 | Rodriguez et al. | |
| 4,623,960 A | 11/1986 | Eng | |
| 4,639,728 A | 1/1987 | Swanson | 340/870.03 |
| 4,642,634 A | 2/1987 | Gerri et al. | |
| 4,646,084 A | 2/1987 | Burrowes et al. | |
| 4,682,169 A | 7/1987 | Swanson | 379/102.07 |
| 4,686,460 A | 8/1987 | Stevens et al. | |
| 4,692,874 A | 9/1987 | Mihara | |
| 4,697,180 A | 9/1987 | Swanson | |
| 4,697,181 A | 9/1987 | Swanson | 340/870.02 |
| 4,697,182 A | 9/1987 | Swanson | 340/870.02 |
| 4,700,280 A | 10/1987 | Onda et al. | |
| 4,701,858 A | 10/1987 | Stokes et al. | |
| 4,713,608 A | 12/1987 | Catiller et al. | |
| 4,754,219 A | 6/1988 | Milkovic | |
| 4,757,456 A | 7/1988 | Benghiat | |
| 4,761,725 A | 8/1988 | Henze | |
| 4,794,369 A | 12/1988 | Haferd | |
| 4,803,632 A | 2/1989 | Frew et al. | |
| 4,804,957 A | 2/1989 | Selph et al. | 340/870.03 |
| 4,814,757 A | 3/1989 | Patterson et al. | |
| 4,831,327 A | 5/1989 | Chénier et al. | |
| 4,853,620 A | 8/1989 | Halder et al. | |
| 4,862,493 A | 8/1989 | Venkataraman et al. | |
| 4,866,587 A | 9/1989 | Wadlington | |
| 4,881,027 A | 11/1989 | Joder et al. | |
| 4,881,070 A | 11/1989 | Burrowes et al. | |
| 4,884,021 A | 11/1989 | Hammond et al. | |
| 4,896,106 A | 1/1990 | Voisine et al. | |
| 4,902,964 A | 2/1990 | Szabela et al. | |
| 4,902,965 A | 2/1990 | Bodrug et al. | |
| 4,908,569 A | 3/1990 | Fest | |
| 4,908,769 A | 3/1990 | Vaughan et al. | |
| 4,922,187 A | 5/1990 | Beverly, II | |
| 4,922,399 A | 5/1990 | Tsuzuki | |
| 4,931,725 A | 6/1990 | Hutt et al. | |
| 4,949,029 A | 8/1990 | Cooper et al. | |
| 4,951,052 A | 8/1990 | Jacob et al. | |
| 4,956,761 A | 9/1990 | Higashi | |
| 4,975,592 A | 12/1990 | Hahn et al. | |
| 4,977,368 A | 12/1990 | Munday et al. | |
| 4,978,911 A | 12/1990 | Perry et al. | |
| 4,998,061 A | 3/1991 | Voisine et al. | |
| 4,999,569 A | 3/1991 | Weikel | |
| 4,999,572 A | 3/1991 | Bickford et al. | 324/103 R |
| 5,010,335 A | 4/1991 | Coppola et al. | |
| 5,014,213 A | 5/1991 | Edwards et al. | |
| 5,017,860 A | 5/1991 | Germer et al. | |
| 5,019,955 A | 5/1991 | Hoeksma | |
| 5,032,785 A | 7/1991 | Mathis et al. | |
| 5,059,896 A | 10/1991 | Germer et al. | |
| 5,122,735 A | 6/1992 | Porter et al. | |
| 5,140,511 A | 8/1992 | Lee et al. | |
| 5,146,394 A | 9/1992 | Ishii et al. | 363/16 |
| 5,151,866 A | 9/1992 | Glaser et al. | |
| 5,153,837 A | 10/1992 | Shaffer et al. | |
| 5,155,670 A * | 10/1992 | Brian | 363/24 |
| 5,173,657 A | 12/1992 | Holdsclaw | |
| 5,175,675 A | 12/1992 | Uramoto | |
| 5,181,026 A | 1/1993 | Granville | |
| 5,184,064 A | 2/1993 | Vicknair et al. | |
| 5,191,338 A * | 3/1993 | Katz et al. | 342/352 |
| 5,229,713 A | 7/1993 | Bullock et al. | |
| 5,237,511 A | 8/1993 | Caird et al. | 702/58 |
| 5,245,275 A | 9/1993 | Germer et al. | |
| 5,268,633 A | 12/1993 | Balch | |
| 5,270,958 A | 12/1993 | Dastous | |
| 5,287,287 A | 2/1994 | Chamberlain et al. | |
| 5,289,115 A | 2/1994 | Germer et al. | 324/107 |
| 5,291,384 A * | 3/1994 | Mammano et al. | 363/17 |
| 5,296,803 A | 3/1994 | Kirby et al. | |
| 5,315,527 A | 5/1994 | Beckwith | |
| 5,325,051 A | 6/1994 | Germer et al. | |
| 5,388,022 A * | 2/1995 | Ahuja | 361/94 |
| 5,391,983 A | 2/1995 | Lisignan et al. | |
| 5,457,621 A | 10/1995 | Munday et al. | 363/56 |
| 5,469,049 A | 11/1995 | Briese et al. | 324/76.77 |
| 5,471,137 A | 11/1995 | Briese et al. | 324/158.1 |
| 5,495,167 A | 2/1996 | Cotroneo | |
| 5,537,029 A | 7/1996 | Hemminger et al. | |
| 5,537,333 A | 7/1996 | Hemminger et al. | 702/60 |
| 5,539,304 A | 7/1996 | Payne et al. | |
| 5,544,089 A | 8/1996 | Hemminger et al. | |
| 5,548,209 A | 8/1996 | Lusignan et al. | |
| 5,548,527 A | 8/1996 | Hemminger et al. | |
| 5,555,508 A | 9/1996 | Munday et al. | |
| 5,602,724 A * | 2/1997 | Balakrishnan | 363/21.15 |
| 5,615,097 A * | 3/1997 | Cross | 363/84 |
| 5,621,629 A * | 4/1997 | Hemminger et al. | 363/56.1 |
| 5,631,554 A | 5/1997 | Briese et al. | 324/76.77 |
| 5,631,843 A | 5/1997 | Munday et al. | 700/286 |
| 5,691,634 A | 11/1997 | Lowe | 324/107 |
| 5,742,151 A | 4/1998 | Hwang | 323/222 |
| 5,808,455 A | 9/1998 | Schwartz et al. | 323/271 |
| 5,903,145 A | 5/1999 | Hemminger et al. | |

| | | | |
|---|---|---|---|
| 6,097,182 A | 8/2000 | Hemminer et al. | 324/142 |
| 6,169,391 B1* | 1/2001 | Lei | 323/266 |
| 6,201,374 B1* | 3/2001 | Ater et al. | 323/267 |
| 6,229,295 B1 | 5/2001 | Hemminger et al. | |
| 6,341,074 B2* | 1/2002 | Yamaguchi | 363/21.04 |
| 6,356,464 B1* | 3/2002 | Balakrishnan et al. | 363/21.01 |
| 6,370,040 B2* | 4/2002 | Hosotani et al. | 363/19 |
| 6,377,033 B2* | 4/2002 | Hsu | 323/274 |
| 6,473,284 B1* | 10/2002 | Ilic et al. | 361/91.1 |
| 6,804,125 B2* | 10/2004 | Brkovic | 363/17 |
| 6,804,127 B2* | 10/2004 | Zhou | 363/37 |
| 6,809,678 B2* | 10/2004 | Vera et al. | 341/166 |
| 7,023,710 B2* | 4/2006 | Durbaum et al. | 363/19 |

FOREIGN PATENT DOCUMENTS

| | | |
|---|---|---|
| EP | 0 092 303 B1 | 10/1986 |
| EP | 0 288 413 A1 | 10/1988 |
| EP | 0 462 045 A1 | 12/1991 |
| GB | 2 095 879 | 1/1982 |
| GB | 2177 805 A | 1/1987 |
| JP | 61-11680 | 1/1986 |
| JP | 61-38569 | 2/1986 |
| JP | 61-284670 | 12/1986 |
| JP | 1-239473 | 9/1989 |
| JP | 1-239474 | 9/1989 |
| JP | 1-239475 | 9/1989 |
| WO | WO 86/05887 | 10/1986 |

OTHER PUBLICATIONS

"Enter the Electronic Metering Age With GE, The Electronic Polyphase Demand Meter, GE Electronic Metering," *GE Meters Brochure*, Somersworth, NH, Sep. 1989.

G.A. Kingston, et al., "Multi Function Polyphase Metering—An Integrated Approach," Schlumberger Industries Electricity Management, UK.

H. Kohler, "Elektronischer Hochprazisionzahler im 19-Zoll-Einbaughehause fur Wirkverbrauch-und Blindverbrauchzuhlung," Siemens Magazine, pp. 345-349, 1977.

HP Eggenberger, "Ein Elektronischer Elektrizitatszahler fur Wir -und Blindverauch," Neue Zurcher Zeitung, Sep. 6, 1989.

M. Schwendtner, et al., "Elektronischer Haushaltszahler" Elektrontechnische Zeitschrift etz, vol. 112, No. 6-7, 1991, pp. 320-323, together with an English translations of the same (Electronic Domestic Meter).

Negahaban, M., A DSP Based Watthour Meter, Silicon Systems, Inc., Nov. 23, 1988.

Negahban, M. et al. "A DSP-Based Watthour Meter" IEEE International Solid State Circuits Conference Digest of Technical Papers 36th ISSC 1st Ed. NY, NY, USA Feb. 15-17, 1989.

Nilsen, "EMS 2100 Electricity Consumption Analyzer—Australian Design Award 1998," pp. 1-16.

P.R. Hutt, et al, "Design, Benefits and Flexibility in Intelligent Metering Technology," Polymeters Limited, UK.

Product Brochure: "KVI Polyphase Combination Meter," Dated Jul. 1988.

Progress in the Art of Metering Electric Energy, Institute of Electrical & Electronic Engineers, Electicity Metering Subcomittee, 1969.

Summers, R., Integrated Semiconductor Solutions For Metering and Telemetering Applications, Texas Instruments, Apr. 1990.

Three-Phase, Watt-Hour Meter IC, Electronic Design, Feb. 23, 1989.

Usenko, VV et al. "Meter For Recording the Energy of Single and Rarely-Repeateing Ultrahigh-Energy Pulses," Radiotekhnika, Kharkov, Ukranian SSR, No. 86, pp. 44-48, 1988, 2REF.

Hutt, P.R. et al., "Design, Benefits and Flexibilty in Intelligent Metering Technology", *Polymeters Limited*, United Kingdom, 67-71.

Summer, S.E. et al., "Wide Input Range Multiple Output Power Supply", *PCI*, Apr. 1983, 228-236.

RM-10 Metronic Portable Watthour Standard-Operations Manual Revisions E, Feb. 1990, Radian Research, Inc., Power and Energy Measurement Specialists.

RM-10, RM-12, RM-15 Operations Manual, Radian Research, Inc.

Videotaped Deposition upon Oral Examination of Glenn A Mayfield (Including Exhibits), In the United States District Court for the District of Delaware, *ABB Automation, Inc., v. Schlumberger Resource Management Services, Inc.*, Case No.:. 01-77SLR, Aug. 20, 2002, 131 pages.

* cited by examiner

POWER SUPPLY FOR AN ELECTRIC METER HAVING A HIGH-VOLTAGE REGULATOR THAT LIMITS THE VOLTAGE APPLIED TO CERTAIN COMPONENTS BELOW THE NORMAL OPERATING INPUT VOLTAGE

FIELD OF THE INVENTION

The invention relates generally to the field of electric utility meters. More particularly, the invention relates to switching power supplies within electric utility meters.

BACKGROUND OF THE INVENTION

Electric utility companies and power consuming industries have in the past employed a variety of approaches to metering electrical energy. Typically, a metering system monitors power lines through isolation and scaling components to derive polyphase input representations of voltage and current. These basic inputs are then selectively treated to determine the particular type of electrical energy being metered. Because electrical uses can vary significantly, electric utility companies have requirements for meters configured to analyze several different nominal primary voltages, the most common of which are 96, 120, 208, 240, 277 and 480 volts, root mean squared (RMS).

Electric utility meters employing electronic components instead of electromechanical components have become more widely used in the industry. The use of electronic components including microprocessor components have made electricity metering faster and more accurate. Of course, the meters typically receive and monitor alternating current (AC) power from the power distribution system, though usually, direct current (DC) power is required to operate the meter's electronic components. Therefore, electronic meters use power supply devices to generate DC power from the already-available and constantly-present AC line voltage. As discussed in U.S. Pat. No. 5,457,621, which is incorporated herein by reference, power supply devices have been created to generate the required microprocessor DC power regardless of the value of the available line voltages (e.g., 96 to 480 volts RMS).

Typically an electric meter power supply device works over the extended range of input AC voltage and develops sufficient output power to supply a variety of communication options within the meter. The power supply device also must withstand severe input voltage transients and meet requirements regarding acceptable levels of conducted electromagnetic interference, such as those set out by the Federal Communications Commission (FCC) and the International Special Committee on Radio Interference (CISPR) of the International Electrotechnical Commission (IEC).

A power supply is able to process an extended range of input voltages and typically includes, among other things, devices that store electrical charge (e.g., capacitors), a switching device in electrical connection with the device that stores electrical charge, and a transformer in electrical connection with the switching device (hereinafter "switching transformer"). FIG. 1 depicts an example embodiment of an electrical circuit of a power supply 100 in a typical commercial or industrial electric meter. Power supply 100 is capable of operating over a wide range of input voltage, which may range from approximately 46 to 530 volts AC (VAC). After the input voltage is rectified by a rectifier 110, two or more devices that store electrical charge 115, 120 directly filter the wide range of rectified direct current voltage (VDC), which may range from approximately 65 to 750 VDC. A switching device 130 and a switching transformer 140 each may handle a wide range of the filtered VDC. This large voltage range creates significant design challenges for power supply components such as devices that store electrical charge 115, 120, switching device 130, and switching transformer 140.

Devices that store electrical charge 115, 120 handle the operating high voltages plus transient voltages. Because of the potential high voltages, the devices must be physically large. For example, such devices 115, 120 each may be capacitors rated for 10 microfarad (μf). Additionally, devices 115, 120 may be associated with resistors 116, 121 to help ensure equal division of voltages across devices 115, 120.

Because of the relatively large size of devices 115, 120, at lower operating voltages, more capacitance is used than is required when the input voltage is at the upper extremes of the voltage range. Therefore power supply 100 has more energy available at high input voltages but loads cannot make use of it. Additionally, because of the size of devices 115, 120, and the nature of switching transformer 140, the layout of the printed circuit board is usually dominated by the combination of devices 115, 120 and switching transformer 140.

To meet the wide voltage range, a cascade circuit such as shown in FIG. 1 may be required to divide the high direct current voltage between a switching device 125 (e.g., a transistor) and a switching regulator. Switching device 125, which may be a metal oxide semiconductor field effect transistor (MOSFET), typically will operate at the switching frequency of switching regulator 130 and handle the full switching current of switching transformer 140. Switching device 125 shares approximately half of the input voltage during periods when the input voltage is above a certain threshold, such as, for example, above 400 volts.

Designing switching transformer 140 to operate over this wide voltage range is also difficult. Usually, to accommodate the wide voltage range, switching transformer 140 operates in continuous mode to meet the low voltage conditions and must provide large primary inductance values to limit the rate of rise of current during high voltage conditions.

Therefore, in a power supply of an electric utility meter, there is a need for a reduction of the wide range of available line voltages that are applied to the components of the power supply so that power supply design may be simplified and the size of the components may be reduced.

SUMMARY OF THE INVENTION

A power supply for use in an apparatus for measuring electrical energy is disclosed, and may include, in one embodiment, a first switching device such as a MOSFET in electrical connection with a capacitor or other device for storing electrical charge such that, when the input voltage to the power supply is below a predetermined amount, the first switching device may enable the input voltage to be applied to the device for storing electrical charge. The embodiment may include a second switching device such as a MOSFET also in electrical connection with the device for storing electrical charge and in electrical connection with a zener diode or other device for controlling a flow of current such that, when the input voltage is greater than the predetermined amount, the first and second switching devices may enable the input voltage to be applied to the device for storing electrical charge. Additionally, the embodiment may include another zener diode or device for controlling the flow of current such that, when the electrical charge stored in the device for storing electrical charge is above a predetermined stored amount and the input voltage is greater than the above-mentioned predetermined amount, current ceases to flow through the first switching device, shutting the device off. While off, the first switching device may maintain the input voltage that is greater than the predetermined amount. In this way, the input voltage applied to the device for storing electrical charge is maintained at or below the predetermined amount.

Also described is a system and method for limiting the rate of rise or fall of current applied to a device for storing electrical charge. The system and method may be included in a power supply and also may be applied to other devices. In one embodiment, the circuitry may include an inductor or other device for generating electromotive force by inductance, a switching device such as a MOSFET, a resistor, and a zener diode or other device for controlling the flow of current such that, when current substantially increases or decreases, the circuitry acts to limit the rate of increase or decrease of the current applied to the device for storing electrical charge. During these periods of substantial increase or decrease in current, the switching device may operate in linear mode when the voltage applied to the switching device and to the inductor is equal to the voltage applied to the device for controlling the flow of electrical current. During this period of linear mode operation of the switching device, the inductor counteracts the rate of rise or fall of current. That is when the voltage applied to the resistor increases with increasing current, the voltage applied to the inductor decreases, and, conversely, when the voltage applied to the resistor decreases with falling current, the voltage applied to the inductor increases.

DETAILED DESCRIPTION OF ILLUSTRATIVE EMBODIMENTS

Figure 2:
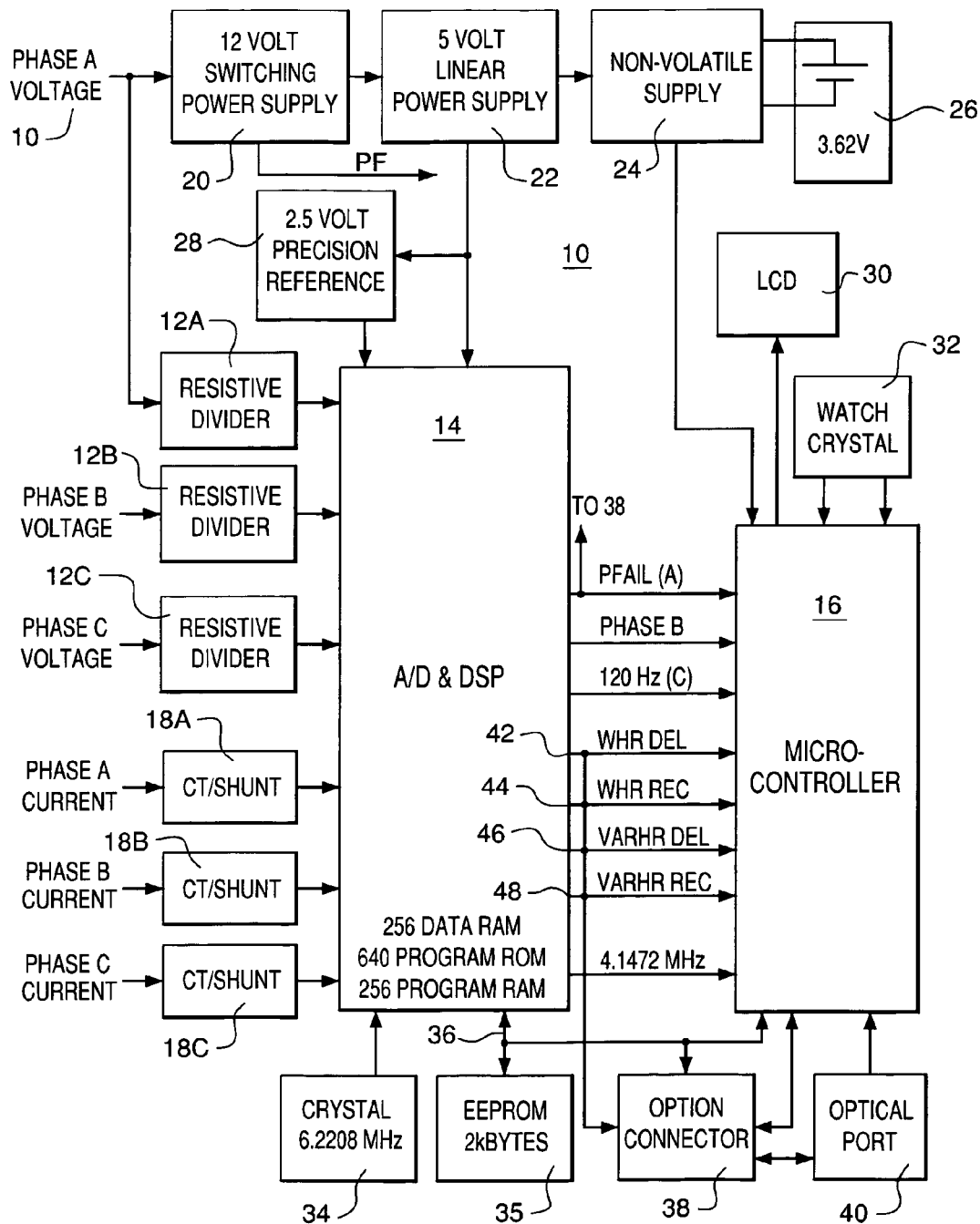
FIG. 2 depicts a block diagram of an example embodiment of an electric meter circuit.

FIG. 2 is a block diagram of an electric meter 10. As shown in FIG. 2, meter 10 is shown to include three resistive voltage divider networks 12A, 12B, 12C; a first processor—an ADC/DSP (analog-to-digital converter/digital signal processor) chip 14; a second processor—a microcontroller 16 which in the preferred embodiment is a Mitsubishi Model 50428 microcontroller; three current sensors 18A, 18B, 18C; a 12 V switching power supply 20 that is capable of receiving inputs in the range of 46-530 alternating current voltage (VAC); a 5 V linear power supply 22; a nonvolatile power supply 24 that switches to a battery 26 when 5 V supply 22 is inoperative; a 2.5 V precision voltage reference 28; a liquid crystal display (LCD) 30; a 32.768 kHz oscillator 32; a 6.2208 MHz oscillator 34 that provides timing signals to chip 14 and whose signal is divided by 1.5 to provide a 4.1472 MHz clock signal to microcontroller 16; a 2 kbyte EEPROM 35; a serial communications line 36; an option connector 38; and an optical communications port 40 that may be used to read the meter. The inter-relationship and specific details of each of these components is set out more fully below.

It will be appreciated that electrical energy has both voltage and current characteristics. In relation to meter 10, voltage signals may be provided to resistive dividers 12A-12C and current signals may be induced in a current transformer (CT) and shunted. The output of CT/shunt combinations 18A-18C may be used to determine electrical energy.

First processor 14 may be connected to receive the voltage and current signals provided by dividers 12A-12C and shunts 18A-18C. As will be explained in greater detail below, processor 14 may convert the voltage and current signals to voltage and current digital signals, determine electrical energy from the voltage and current digital signals and generate an energy signal representative of the electrical energy determination. Processor 14 may generate a watthour delivered (Whr Del) and watthour received (Whr Rec), depending on the type of energy being metered, may generate either a volt amp reactive hour delivered (Varhr Del) and a volt amp reactive hour received (Varhr Rec) signal, or volt amp hour delivered (Vahr Del) and volt amp hour received (Vahr Rec) signal. In an example embodiment, each transition on conductors 42-48 (i.e., each logic transition) is representative of the measurement of a unit of energy. Second processor 16 is connected to first processor 14. As will be explained in greater detail below, processor 16 may receive the energy signal(s) and generate an indication signal representative of the energy signal.

It will be noted again that meter 10 is a wide range meter capable of metering over a voltage range from approximately 46-530 VAC. The components which enhance such a wide range meter may include the divider network 12A-12C, which as previously noted may be connected to receive the voltage component. The dividers may generate a divided voltage, wherein the divided voltage is substantially linear voltage with minimal phase shift over the wide dynamic range, i.e. 46-530 volts. A processing unit (including processors. 14, 16) may be connected to receive the divided voltage and the current component. The processing unit may process the divided voltages and the current components to determine electrical energy metering values. It will be appreciated from the following description that processors 14, 16 may require stable supply voltages to be operable. A power supply 20, connected to receive the voltage component and connected to processors 14, 16, may generate the necessary supply voltages from the Phase A voltage component over the wide dynamic range. Power supply 20 could also run off of phase B or phase C voltages or a combination of the above. A combination embodiment may require additional protection and rectifying components.

In relation to the example embodiment of meter 10, currents and voltages may be sensed using conventional current transformers (CT's) and resistive voltage dividers, respectively. The appropriate multiplication may be accomplished in a new integrated circuit, e.g., processor 14. Processor 14 may be essentially a programmable digital signal processor (DSP) with built in multiple analog to digital (A/D) converters. The converters may be capable of sampling multiple input channels simultaneously at 2400 Hz each with a resolution of 21 bits, and then the integral DSP performs various calculations on the results.

Meter 10 can be operated as either a demand meter or as a time-of-use (TOU) meter. It will be recognized that TOU meters are becoming increasingly popular due to the greater differentiation by which electrical energy is billed. For example, electrical energy metered during peak hours will be billed differently than electrical energy billed during non-peak hours. As will be explained in greater detail below, first processor 14 determines units of electrical energy while processor 16, in the TOU mode, qualifies such energy units in relation to the time such units were determined, e.g., the season as well as the time of day.

All indicators and test features may be brought out through the face of meter 10, either on LCD 30 or through optical communications port 40. Power supply 20 for the electronics may be a switching power supply feeding low voltage linear supply 22. Such an approach allows a wide operating voltage range for meter 10.

In an example embodiment of the present invention, meter components and register electronics all may be located on a single printed circuit board (not shown) defined as an electronics assembly. This electronics assembly may house power supplies 20, 22, 24 and 28, resistive dividers 12A-12C for all three phases, the shunt resistor portion of 18A-18C, oscillator 34, processor 14, processor 16, reset circuitry, EEPROM 35, oscillator 32, optical port components 40, LCD 30, and an option board interface 38. When this assembly is used for demand metering, the billing data may be stored in EEPROM 35. This same assembly may be used for TOU metering applications by merely utilizing battery 26 and reprogramming the configuration data in EEPROM 35. The additional time-of-use billing data may be stored in the internal RAM of processor 16, which RAM is backed by battery 26.

Primary current being metered may be sensed using conventional current transformers. The shunt resistor portion of devices 18A-18C may be located on the electronics assembly. The phase voltages are brought directly to the electronic assembly where resistive dividers 12A-12C scale these inputs to processor 14. In one embodiment, the electronic components are referenced to the vector sum of each line voltage for three wire delta systems and to earth ground for all other services. Resistive division is used to divide the input voltage so that a very linear voltage with minimal phase shift over a wide dynamic range can be obtained; This in combination with a switching power supply device allows the wide voltage operating range to be implemented.

A switching power supply 20 may be designed to operate over a 46-530 VAC input range. It may connect to the Phase A voltage alternating current (AC) line. A flyback converter, which is a type of power supply, may serve as the basis of the circuit.

As used herein, the "AC cycle" refers to the 60 Hz or 50 Hz input to power supply 20. The "switching cycle" refers to the 50 kHz to 140 kHz frequency at which the switching transformer of power supply 20 operates. It will be noted that other switching cycle frequencies can be used.

Figure 3:
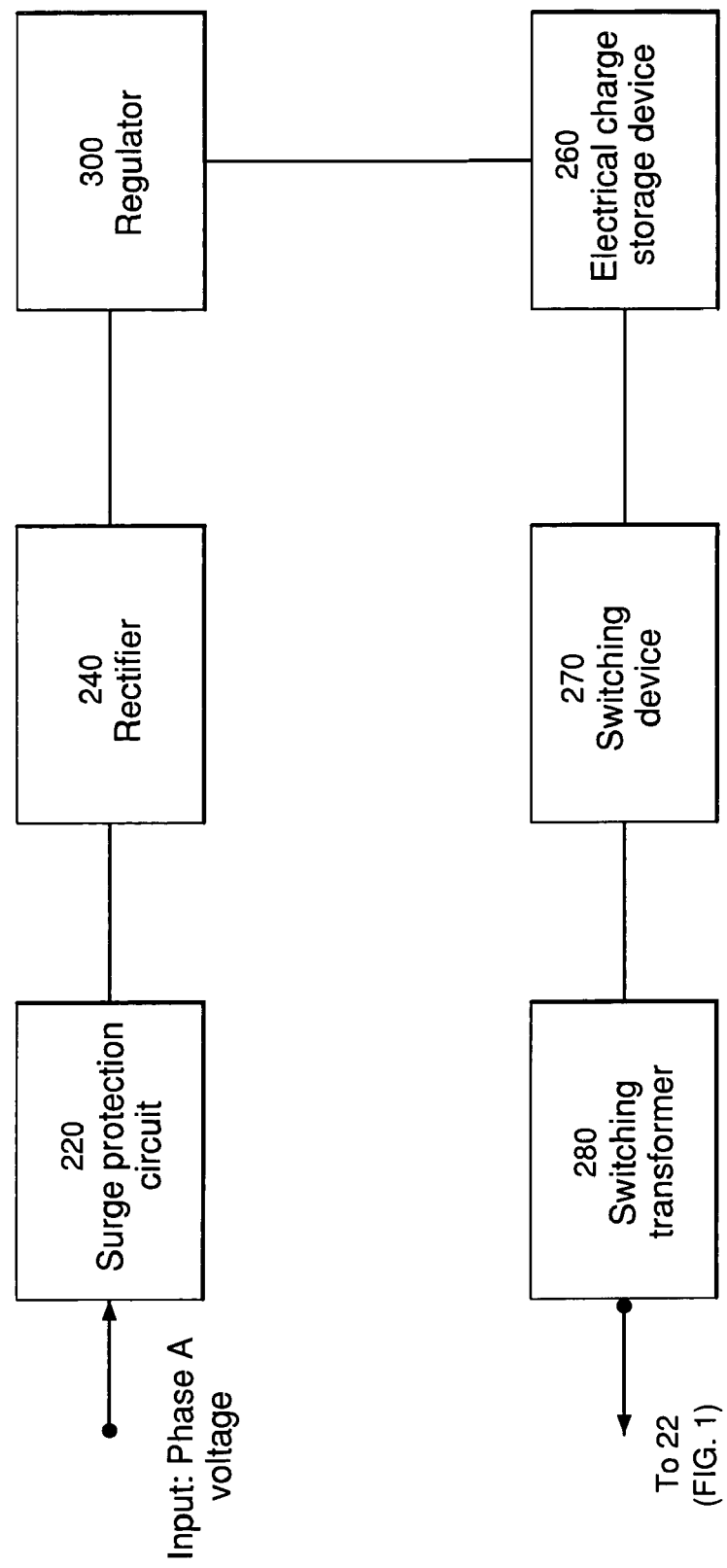
FIG. 3 depicts a block diagram of an example embodiment of a power supply.

FIG. 3 depicts a block diagram of an example embodiment of power supply device 20 for use in an electric meter. Power supply device 20 may include a surge protection circuit 220 that receives an input voltage. Surge protection circuit 220 may protect against surges appearing in the input voltage caused by, for example, lightning strikes. Surge protection circuit 220 may be connected to a voltage rectifier 240 that rectifies the input alternating current voltage. Rectifier 240 may be a bridge rectifier, and the rectified voltage may be full-wave or half-wave rectified. Rectifier 240 may be connected to a regulator 300, which may limit the wide range of rectified voltage applied to other components in power supply 20. A device for storing electrical charge 260 may be connected to regulator 300 and may receive the more limited range of voltage from regulator 300. Such a device 260 may be a capacitor. Device 260 may filter the voltage, which may then be applied to a switching device 270 and to a switching transformer 280. Switching transformer 280 may have primary and secondary windings. The voltage that is rectified by rectifier 240 and regulated by regulator 300 may be provided to the primary winding so that current may flow through the primary winding. The secondary winding may define the output of power supply 20. Switching device 270 may be connected to the primary winding of switching transformer 280 and to the device for storing and discharging electrical charge 260. Switching device 270 may control the flow of current through the primary winding by permitting and preventing such flow.

Figure 4:
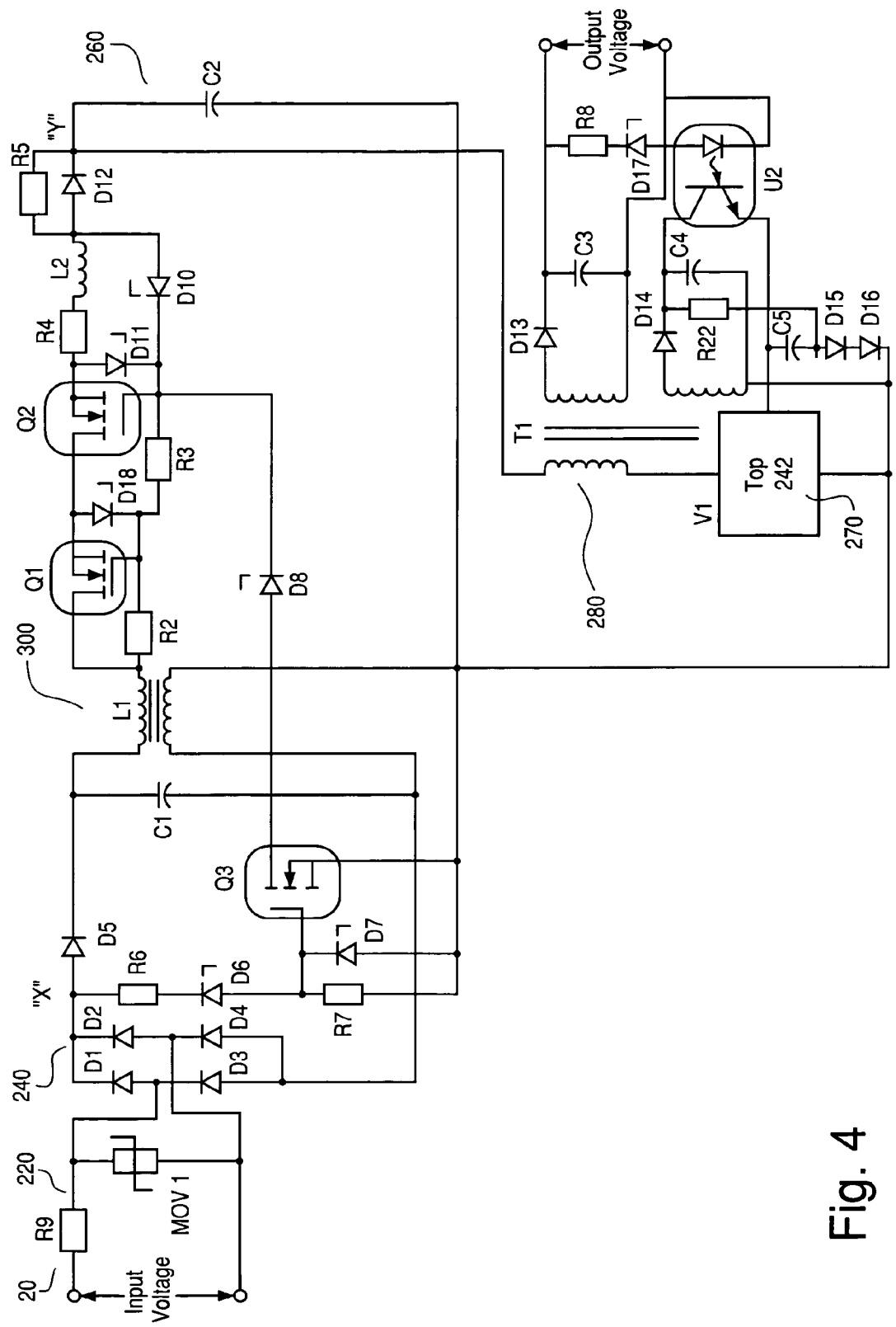
FIG. 4 depicts a schematic diagram of an example embodiment of a power supply.

FIG. 4 is a schematic diagram of an example embodiment of power supply device 20. Surge protection circuit 220 may comprise a varistor MOV 1, such as a metal oxide varistor, that, in combination with a resistor R9, may protect power supply 20 from, for example, lighting strike surges. Voltage rectifier 240 may be in electrical connection with surge protection circuit 220 and may rectify the input alternating current voltage. Rectifier 240 may include diodes D1-D4 and also may be a bridge rectifier. Rectifier 240 may be connected to regulator 300. Regulator 300 may include a second, third, and fourth switching device Q1, Q2, Q3, a first, second, and third device for controlling the flow of current D6, D8, D10, resistors R2, R3, R4, and inductive devices for creating electromagnetic force by inductance L1, L2. The device for storing electrical charge 260 may be in electrical connection with regulator 300 and to a first switching device 270. First switching device 270 may be connected to switching transformer 280.

In an example embodiment, switching devices Q1, Q2, Q3 may be 1000 volt, metal-oxide semiconductor field effect transistors (MOSFETs). Switching devices Q1, Q2, and Q3, therefore, may be referred to as, respectively, MOSFETs Q1, Q2, and Q3, though switching devices Q1, Q2, and Q3 may be other types of switching devices. The first device for controlling the flow of current D6 may be a 320 volt zener diode, and the second device for controlling the flow of current D8 may be a 120 volt zener diode. The devices for controlling the flow of current D6, D8, D10 may be referred to as, respectively, zener diodes D6, D8, D10, though the devices for controlling the flow of current D6, D8, D10 may be other types of devices. The inductive devices for creating electromagnetic force by inductance L1, L2 may be inductors, each in the form of a coil of conductive wire, and therefore may be referred to as inductors L1, L2 though the inductive devices L1, L2 may be other types of devices as well. The device for storing electrical charge 260 may be a 10 μf capacitor C2, and may be referred to as capacitor C2, though the device for storing electrical charge 260 may be another type of device. Switching device 270 may be a TOP 242 controller by Power Integrations, Inc., or other appropriate switching device.

MOSFET Q1 may be connected in electrical series with MOSFET Q2, and MOSFET Q2 may be in electrical connection with zener diode D6. MOSFET Q3 may also in electrical connection with zener diode D6. MOSFETs Q1, Q2, Q3 may be connected to zener diode D6 such that, when the rectified input voltage at a point labeled X is below the reverse biasing voltage of zener diode D6 (320 volts in the example embodiment), MOSFET Q3 may be OFF, and MOSFETs Q1, Q2 may have gate to source drive voltage through resistors R2, R3. The drive voltage allows MOSFETs Q1, Q2 to be ON with a low value of series dropping voltage (determined by the amount of gate to source voltage). When the current flowing through MOSFETs Q1, Q2 is of a low value, MOSFETs Q1, Q2 may operate as saturated switches and provide voltage to capacitor C2. This mode may be maintained unless the input voltage or the current through MOSFETs Q1, Q2 significantly increases.

When the rectified input voltage at point X is above the reverse biasing voltage of zener diode D6 (e.g., 320 volts in the example embodiment), positive gate to source voltage may be provided to MOSFET Q3, turning MOSFET Q3 ON. MOSFETs Q2, Q3 as well as capacitor C2 may be in electrical connection with zener diode D8 such that when the voltage stored in capacitor C2 is less than the reverse biasing voltage of zener diode D8 and the input voltage is such that MOSFETs Q1, Q2, Q3 are ON, the three MOSFETS provide voltage to capacitor C2. In one embodiment, the reverse biasing voltage of zener diode D8 is 120 volts. When the stored charge in capacitor C2 is above the reverse biasing voltage of zener diode D8 (e.g., 120 volts), and the rectified input voltage at point X is above the reverse biasing voltage of zener diode D6 (e.g., 320 volts), then MOSFET Q3 may provide a path for the gate of MOSFET Q2 to be pulled below the source of MOSFET Q2 to turn OFF the series pair of MOSFETs Q1, Q2.

Figure 1:
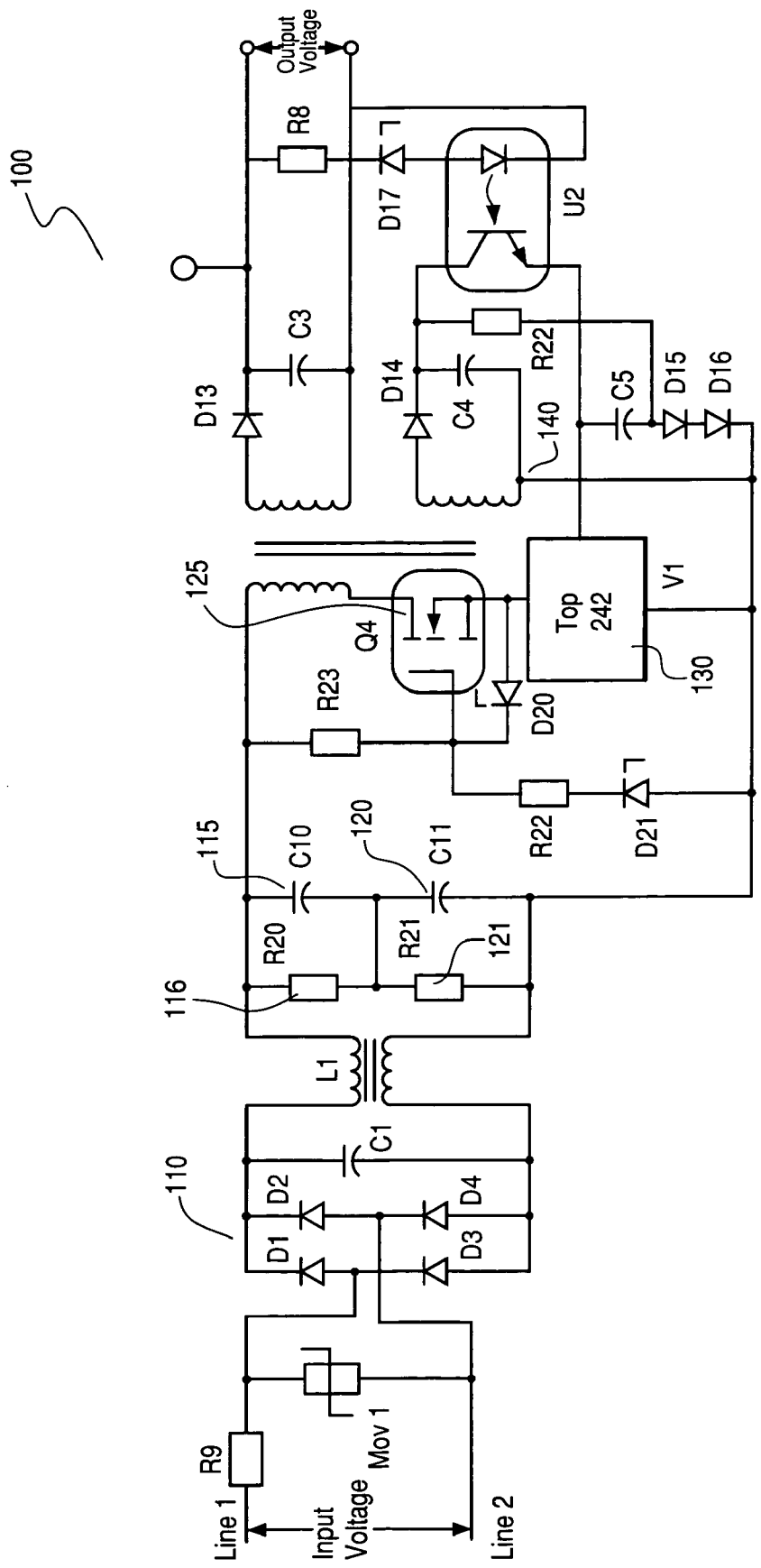
FIG. 1 depicts a schematic diagram of an example embodiment of a prior art power supply.

In the example embodiment depicted in FIG. 4, under these circumstances, current will flow through resistor R5, zener diode D10, zener diode D8, and MOSFET Q3 to shut OFF MOSFETs Q1, Q2. In this way, the maximum voltage applied to MOSFET Q3 and stored in capacitor C2 is the reverse bias voltage of zener diode D6 (e.g., 320 volts), with MOSFETs Q1 and Q2 sharing the remainder of the rectified input voltage above 320 volts. Because the maximum voltage applied to capacitor C2 (and therefore to switching device 270 and switching transformer 280) is more limited than the range of rectified input voltages, one capacitor C2 may take the place of two capacitors C10, C11 (FIG. 1) required in typical power supply devices. Because one capacitor suffices, resistors R20, R21 (FIG. 1) may not be necessary.

Figure 5:
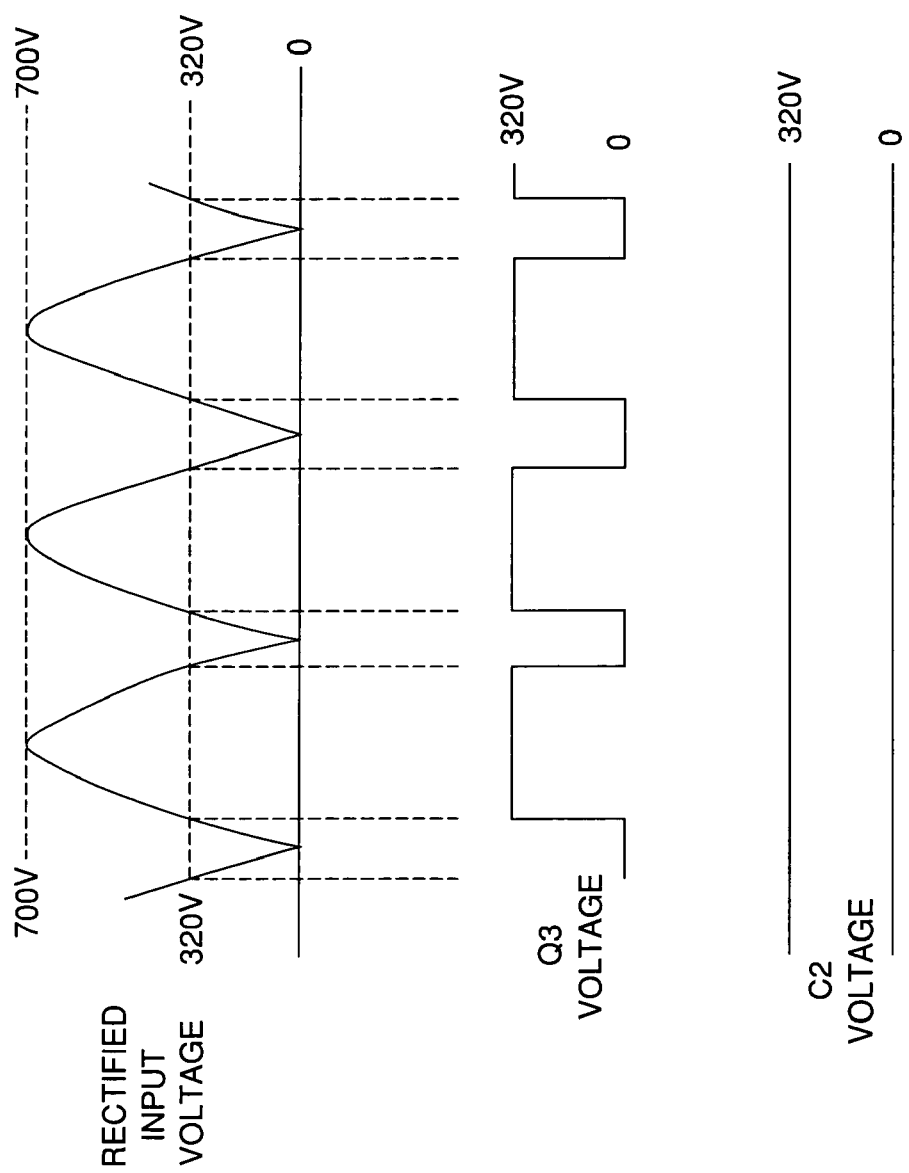
FIG. 5 depicts a graphical illustration comparing the rectified input voltage with the voltage on MOSFET Q3 and the voltage applied to capacitor C2 as a function of time.

FIG. 5 depicts a graphical illustration comparing the rectified input voltage with the voltage on MOSFET Q3 and the voltage applied to capacitor C2 as a function of time. FIG. 5 shows that when the rectified input voltage is less than 320 volts, no voltage is applied to Q3. When the rectified input voltage rises above 320 volts, the voltage applied to Q3 is 320 volts and the maximum voltage stored in capacitor C2 is likewise 320 volts.

Referring back to FIG. 4, the value of zener diode D8 may be selected to prevent early shut off of MOSFETs Q1, Q2 during startup conditions when capacitor C2 has not reached an adequate voltage to support the regulated output voltage of the switching device 270. If capacitor C2 does not reach a workable level before the input charge current is cycled, startup of switching device 270 may be oscillatory. This adverse effect may be caused by soft-start characteristics of certain controllers, such as the TOP 242 controller distributed by Power Integrations, Inc. This type of controller may require time to reach a stable output voltage and, with inadequate time, the controller may assume that a heavy load is present, resulting in a soft start. Because switching device 270 may draw a higher average current during startup than during normal run conditions, a potential oscillation may occur if an improper value for zener diode D8 is selected. For a switching device such as the TOP 242 distributed by Power Integrations, Inc., a proper value for zener diode D8 may be 120 volts.

In addition to limiting the wide range of input voltages to the electric utility meter before application of the voltages to components within power supply 20 (such as capacitor C2, switching device 270, and switching transformer 280), FIG. 4 also depicts an example embodiment that includes a system for reducing the rate of rise and the rate of fall of current in power supply 20. Such changes in current may be caused, for example, during the start-up of power supply 20.

The system for reducing the rate of rise and the rate of fall of current may enable power supply 20 to meet standards related to electromagnetic interference. For example, in a power supply lacking an inductor such as inductor L2, the current pulses delivered from the rectified input to capacitor C2 would have sharp leading and falling edges, limited only by the switching characteristics of MOSFETs Q1, Q2. The result would be that conducted electromagnetic interference may exceed limits set out in applicable standards or regulations. To limit the rate of rise and fall of the current pulses, inductor L2 is added to the current limit circuitry.

As shown in FIG. 4, the system and method for limiting the rate of rise and fall of current includes the use of inductor L2, resistor R4, MOSFET Q2, and zener diode D10. When MOSFETs Q2 and Q1 attempt to deliver a fast rising current pulse to capacitor C2, inductor L2 develops a voltage across it proportional to the rate of rise. The rate of rise of current in inductor L2 may be determined using the equation E=L di/dt, where E is the induced electromotive force in volts, L is the inductance in henrys, di is the change in current in amperes, and dt is the length of time.

When the voltage across L2 plus the gate to source voltage of MOSFET Q2 is equal to the voltage across zener diode D10, MOSFET Q2 begins to operate in linear mode to restrict the rate of rise. As current begins to build, the gate to source voltage on MOSFET Q2 may increase accordingly. The voltage across resistor R4 may also increase, and the voltage on inductor L2 may decrease. The result may be a decreasing rate of rise of current as the current magnitude increases. This rate of rise control is operative until either the current limit level is reached or until the current reaches a final steady state level. During the period of the control (e.g., when MOSFET Q2 is in linear mode) MOSFETs Q1, Q2 share the rectified input voltage equally.

The system limiting the rate of rise of current also operates to limit the rate of fall when current suddenly drops. When current is flowing to capacitor C2 and a shut-off signal is received from MOSFET Q3, inductor L2 will restrict the rate of fall of current through MOSFETS Q2, Q1. This occurs because when the current attempts to drop (negative di/dt), a voltage is generated across inductor L2 in a direction to forward bias the gate to source voltage of MOSFET Q2. The reducing current through inductor L2 generates a forward bias voltage through zener diode D10 to equal the gate to source voltage of MOSFET Q2 plus the voltage across resistor R4. As the current reduces (with the rate of change controlled by L2), the gate to source voltage of MOSFET Q2 reduces and the voltage across resister R4 reduces. These reductions cause an increase in the voltage applied to inductor L2, causing a decrease or lowering in the rate of decreasing current. During this period, MOSFETS Q1, Q2 share voltage equally.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. For example, although the invention has been described as using MOSFETs, zener diodes, etc., those skilled in the art will recognize that the invention is not limited to such devices. Likewise other values for the devices in the power supply may be used (e.g., zener diode D6 can be values other than 320 volts). Additionally, the invention has been described with regard to an example schematic diagram. Those skilled in the art, however, will recognize that, for example, a reduction in the wide range of rectified input voltages may be achieved using other schematics within the spirit of the invention.

Accordingly, it should be appreciated that those skilled in the art, having the benefit of the teachings of this specification, may affect numerous modifications thereto and changes may be made without departing from the scope and spirit of the invention.

What is claimed:

1. A power supply that receives at least one alternating current (AC) input voltage and produces therefrom a DC output voltage, said power supply comprising:
    at least one rectifier that receives and rectifies the AC input voltage;
    a transformer comprising first and second windings, wherein the first winding is connected to receive the rectified input voltage so that current flows through said first winding, and wherein a voltage produced across the second winding defines the output voltage of the power supply;
    a first switching device, in electrical connection with the first winding, that controls the flow of current through the first winding to regulate the output voltage;
    a device for storing electrical charge connected in parallel with the first winding, the device for storing electrical charge also being connected to receive the rectified input voltage;
    a regulating device connected between the rectifier and the device for storing electrical charge, the first winding and the first switching device, the regulating device comprising a second switching device and a third switching device connected in series, wherein when the rectified input voltage exceeds a predetermined amount, the incremental amount of the rectified input voltage above the predetermined amount is applied to the second and third switching devices instead of the device for storing electrical charge, the first winding and the first switching device, thereby limiting the amount of the rectified input voltage applied to the device for storing electrical charge, the first winding and the first switching device to the predetermined amount; and
    circuitry connected between the rectifier and the device for storing electrical charge that limits the rate of rise and fall and the magnitude of current delivered by the rectifier to the device for storing electrical charge.

2. The power supply of claim 1, wherein the device for storing electrical charge comprises a capacitor.

3. The power supply recited in claim 1, wherein the predetermined amount of voltage is approximately 320 volts RMS.

4. The power supply of claim 1, wherein the each of the second and third switching devices comprises a MOSFET.

5. The power supply recited in claim 1, wherein the regulating device further comprises a control device electrically coupled to the second and third switching devices, wherein when the rectified input voltage exceeds the predetermined amount, an output of the control device causes the second and third switching devices to change to a state in which no current flows through the second and third switching devices.

6. The power supply recited in claim 5, wherein the control device comprises a MOSFET.

7. The power supply of claim 1, wherein the circuitry comprises an inductor and a resistor.

8. The power supply of claim 1, wherein the AC input voltage is alternating current voltage of an amount between approximately 46 and 53 VAC RMS.

9. The power supply of claim 1, wherein the first switching device comprises a Power Integrations, Inc., TOP 242 switch.

10. A power supply that receives at least one alternating current (AC) input voltage and produces therefrom a DC output voltage, said power supply comprising:
    at least one rectifier that receives and rectifies the AC input voltage;
    a transformer comprising first and second windings, wherein the first winding is connected to receive the rectified input voltage so that current flows through said first winding, and wherein a voltage produced across the second winding defines the output voltage of the power supply;
    a first switching device, in electrical connection with the first winding, that controls the flow of current through the first winding to regulate the output voltage;
    a device for storing electrical charge connected in parallel with the first winding and also connected to receive the rectified input voltage; and
    a regulating device connected between the rectifier and the device for storing electrical charge, the first winding and the first switching device, the regulating device comprising a second switching device and a third switching device connected in series, wherein when the rectified input voltage exceeds a predetermined amount, the incremental amount of the rectified input voltage above the predetermined amount is applied to the second and third switching devices instead of the device for storing electrical charge, the first winding and the first switching device, thereby limiting the amount of the rectified input voltage applied to the device for storing electrical charge, the first winding and the first switching device to the predetermined amount; and
    means for limiting the rate of rise and fall and the magnitude of current delivered by the rectifier to the device for storing electrical charge.

11. The power supply of claim 10, wherein the device for storing electrical charge comprises a capacitor.

12. The power supply recited in claim 10, wherein the predetermined amount of voltage is approximately 320 volts RMS.

13. The power supply of claim 10, wherein the means for limiting comprises an inductor and a resistor.

14. The power supply of claim 10, wherein the AC input voltage is alternating current voltage of an amount between approximately 46 and 530 VAC RMS.

15. The power supply of claim 10, wherein the first switching device comprises a Power Integrations, Inc., TOP 242 switch.

* * * * *